July 24, 1962  V. M. TYLER  3,045,623
UNDERWATER VEHICLE
Filed March 31, 1960  3 Sheets-Sheet 1

INVENTOR.
VERNAL M. TYLER,
BY
Donald L. Royer
AGENT.

INVENTOR.
VERNAL M. TYLER,
BY
AGENT.

July 24, 1962

V. M. TYLER 3,045,623

UNDERWATER VEHICLE

Filed March 31, 1960

INVENTOR.
VERNAL M. TYLER,
BY
Donald L. Ryan
AGENT

United States Patent Office 3,045,623
Patented July 24, 1962

3,045,623
UNDERWATER VEHICLE
Vernal M. Tyler, Rolling Hills, Calif., assignor to Hughes Aircraft Company, Culver City, Calif., a corporation of Delaware
Filed Mar. 31, 1960, Ser. No. 18,907
3 Claims. (Cl. 114—16.8)

This invention relates generally to underwater vehicles and relates more particularly to underwater vehicles that are intended as means for transporting objects from the floor of a body of water to the surface of the water.

In raising objects submerged in extremely deep water, problems have long existed in connection with means for lowering a vehicle, basket, claw or the like, and for thereafter raising such structures from these extreme depths. At such extreme depths, hydraulic pressures are experienced which prevent the use of normally available apparatus used in relatively shallow water. Furthermore, when objects submerged at great depths are supported by cables, chains or other means, the tensile strength versus the weight of such supports limits the length thereof, thus negating the use of these supports in water having a depth in the order of and up to 37,000 feet.

Numerous contemporary activities and discoveries have provided a need for underwater vehicles of the type disclosed herein. For example, recent studies have indicated the presence of precious and semiprecious minerals and metals in nodule form that exist in deep portions of the world's oceans. An efficient, economical means for recovering such material is provided in the apparatus of this invention. Furthermore, portions of sunken objects, ships and the like may also be recovered through the use of the present vehicle. The vehicle hereof provides means for supporting, lowering and subsequent raising of a container. When resting on the floor of a body of water in relatively shallow depths, the container carried by the present vehicle may have objects placed therein by a human diver or mechanical means operated either directly or by remote control. At extreme depths where surface supports cannot be employed, or in areas that might be dangerous to a human diver, the container may have objects placed therein by a remotely controlled apparatus.

Prior attempts toward solving these problems have resulted in apparatus taking the form of large and cumbersome machinery that is not only expensive but also impractical for use at extreme depths. Furthermore, prior apparatus has also required elaborate control mechanisms or human operators therein to effect use thereof.

It is therefore one important object of the present invention to provide an improved underwater vehicle that may be used to support and transport a suitable container and objects placed in the container.

It is another important object of the present invention to provide an underwater vehicle having a novel configuration enabling efficient use in an underwater environment.

A further object of the present invention is to provide an underwater vehicle having simple and efficient means for controlling the buoyancy thereof, whereby to effect travel within an underwater environment.

A still further important object of the invention is to provide an underwater vehicle having means for withstanding extremely high pressures and for maintaining a relatively constant pressure differential across a body thereof.

A further object of the invention is to provide an underwater vehicle that may be flooded to cause the vehicle to sink in a body of water and having means for thereafter driving the water therefrom, whereby to buoy the vehicle.

Other and further important objects of the invention will become apparent from the disclosures in the following detailed specification, appended claims and accompanying drawings, wherein:

Figure 1:
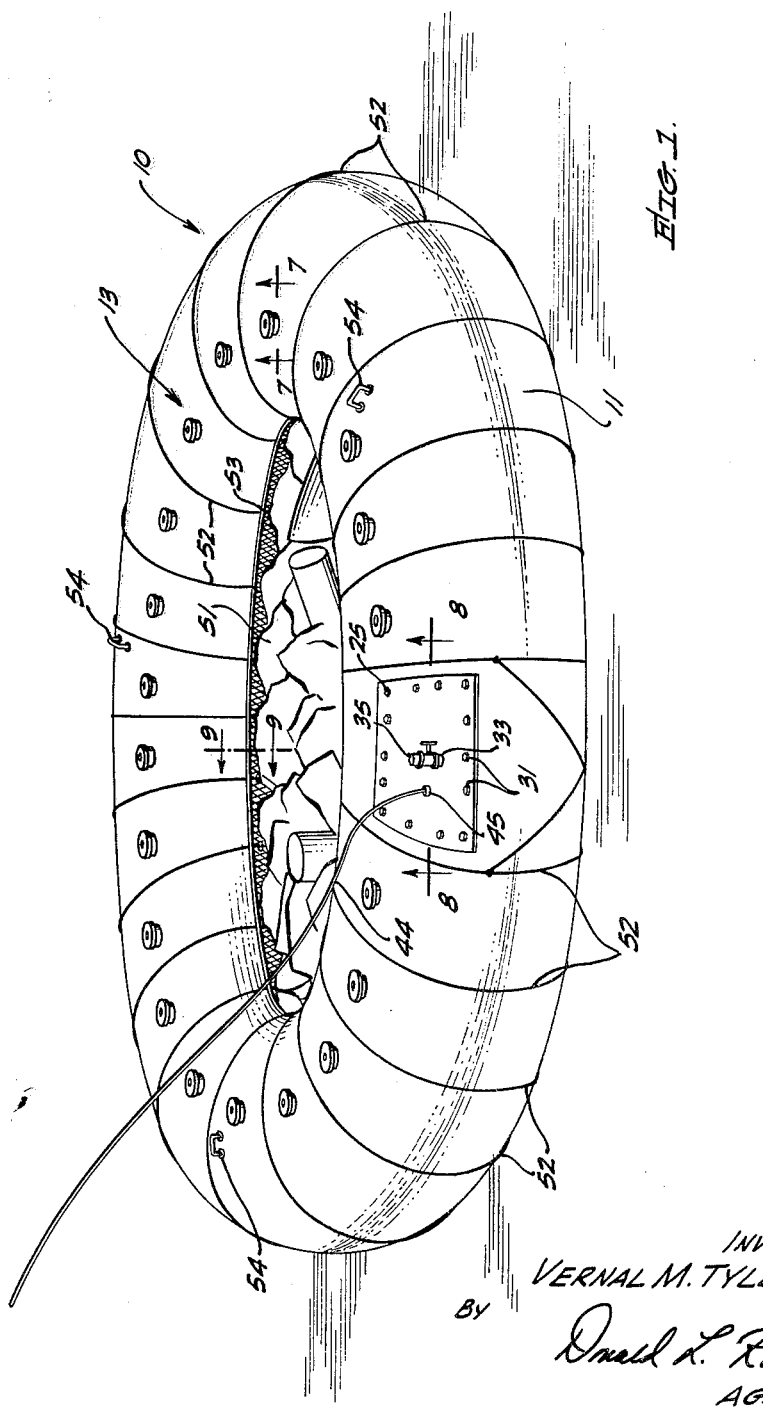
FIGURE 1 is a perspective view of the present underwater vehicle, shown resting upon the surface of a body of water.
Figure 9:
Figure 6:
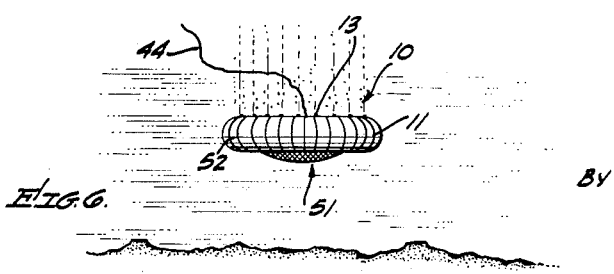
FIG. 6 is a view similar to FIGS. 4 and 5, showing the vehicle in a buoyant condition and rising from the floor of a body of water.
Figure 8:
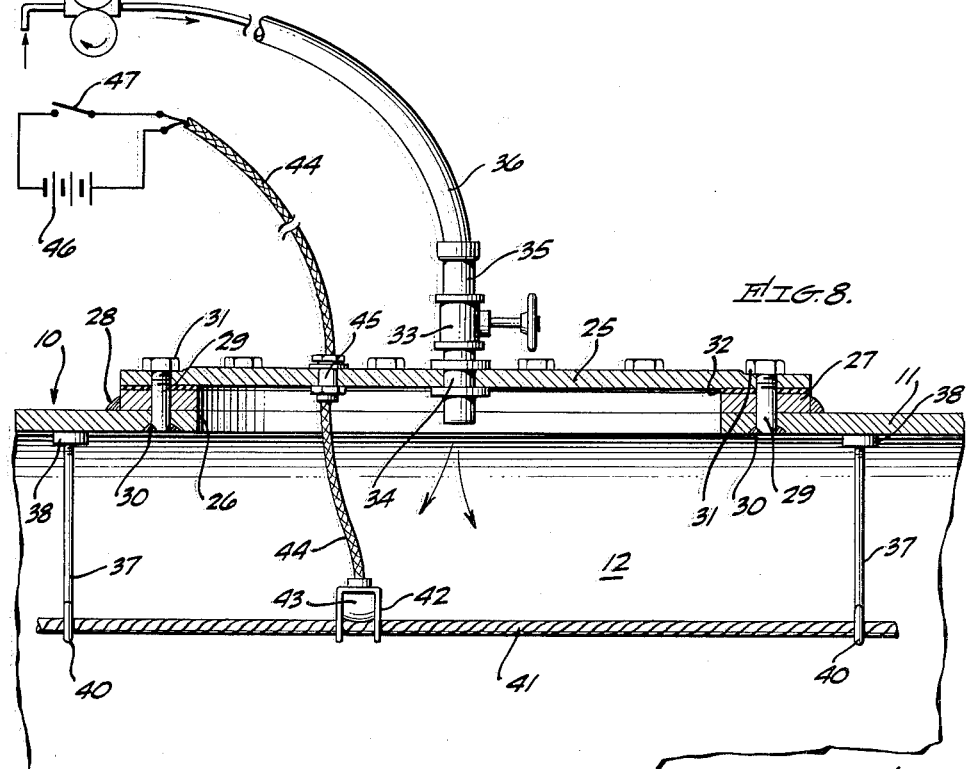

FIG. 8 is an enlarged, fragmentary, sectional view showing details of the explosive fuse arrangement, support therefor and means for flooding the interior of the vehicle, as taken substantially and indicated by line 8—8, FIG. 1; and FIG. 9 is an enlarged, fragmentary, sectional view showing details of the attachment means for a container to the vehicle, as taken substantially and indicated by line 9—9, FIG. 1.

With reference to the drawings, the underwater vehicle of this invention is shown as indicated generally at 10. The vehicle comprises, generally, a body 11, that is in the shape of a torus. The body may be constructed from any suitable high strength material such as steel or the like and has relatively heavy walls, an inner surface of which defines a toroidal chamber 12. In practice, the body 11 may be constructed in half-torus shaped sections and secured together as by welding or the like to form the completed body. It has been found that such a toroidal configuration provides an ideal structural shape to withstand both implosive and explosive stresses. Additionally, this toroidal configuration provides an advantageous shape from a hydrodynamic standpoint to aid in vertical movement of the vehicle in water.

Figure 7:
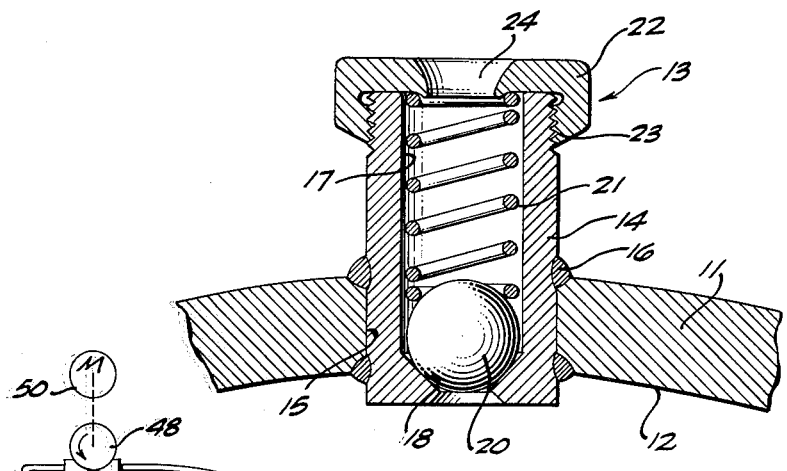
FIG. 7 is an enlarged, fragmentary, sectional view, partially diagrammatic, showing details of a check valve mechanism of the present invention, as taken substantially and indicated by line 7—7, FIG. 1.

As shown, the upper portion of the wall of the body 11 is provided with a plurality of upwardly directed circumferentially spaced differential check valves, indicated generally at 13 and typically illustrated in detail in FIG. 7. The check valves 13 each include a tubular body portion 14 that is secured in an opening 15 in the wall 11 of the body 10 as by welding indicated at 16. The body 14 has a longitudinal bore 17, there being a valve seat 18 formed from one end of the bore 17. A valve member in the form of a ball 20 is adapted for disposition on the seat 18 and is retained thereon by means of a compression spring 21, the other end of which engages an inner surface of a cap member 22 that is threadably secured to the body 14 as at 23. The cap member 22 has a central opening 24. The spring 21 serves as a regulating member to maintain the ball 20 on the seat 18 until the pressure differential between the chamber 12 and the ambient environment reaches a predetermined limit, and permits fluid flow from the chamber 12 to the environment by way of the bore 17 and opening 24 and for a purpose to be hereinafter more fully described.

The housing 11 also supports an access hatch in the form of a plate 25, FIGS. 1 and 8. The plate 25 provides a closure for an access opening 26 in the body 11 of the vehicle 10. The opening 26 is surrounded by a stiffening member 27 that is secured to the body 11 as by welding 28. A plurality of studs 29 are secured to the body 11 as by welding 30 and extend outwardly through the stiffening member 27 and through suitable openings in the plate 25. Nuts 31 are adapted for threadable engagement with the outer ends of the studs 30, whereby to secure the plate 25 in position. A gasket or sealing member 32 is also disposed between the plate 25 and the stiffening member 27. The opening 26 is of such a size and shape as to permit access to the chamber 12 within the body 11.

The plate 25 also serves to support a valve 33 that is connected to a fitting 34 that is, in turn, secured to and extends through the plate 25. The valve 33 has a quick disconnect fitting 35 secured to the side thereof remote from the plate 25, to enable attachment of a hose or the like indicated at 36 and for a purpose to be hereinafter more fully described.

As further illustrated in FIG. 8, a plurality of hangers 37 are connected to suitable fittings 38 and disposed within the chamber 12. The fittings 38 are secured to an inner surface of the wall of the body 11 of the vehicle 10. Free ends of the hangers 37 are positioned in the approximate center of the chamber 12 and are provided with ring portions 40 which serve to support an explosive device which may be in the form of a detonating fuse 41 which may be of a type commonly known as a Primacord. The fuse 41 is characterized by having a high detonating rate and is fed through and supported by the ring portions 40 of the hangers 37. A bracket 42 is fixed about the fuse 41 and serves to support a detonator in the form of an electrically operated detonating squib 43. An electrical cable 44 extends from the bracket 42 and squib 43 through a liquid-tight fitting 45 carried by the plate 25 and to a suitable source of energy such as a battery 46, a switch 47 being provided to enable energization of the squib 43 and detonation of the fuse 41.

With further reference to FIG. 8, the hose 36 is connected to a suitable pump 48 that may be driven by a motor 50 which serves to provide means for forcing water into the chamber 12 as will be hereinafter more fully described.

The vehicle 10 and the body 11 thereof serve to support a container in the form of a wire rope basket indicated generally at 51. The basket 51 is disposed in the eye of the torus-shaped body 11 with a plurality of cables 52, forming a portion of the basket and extending radially about the body 11, being secured together as by suitable U-bolts 53 or the like, as shown in FIG. 9. The basket 51 is of sufficient depth to extend below a lower surface of the body 11, whereby to establish a relative low center of gravity when the vehicle descends in water or when it is raised and loaded with objects to be carried thereby. This low center of gravity insures an upright attitude of the vehicle at all times.

Figure 3:
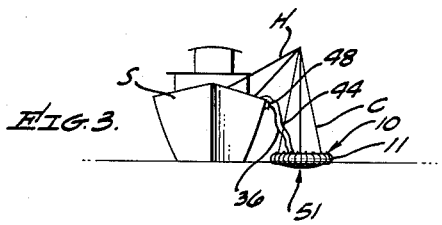
FIG. 3 is a generally schematic view showing the means for initially disposing the vehicle in a body of water.
Figure 4:
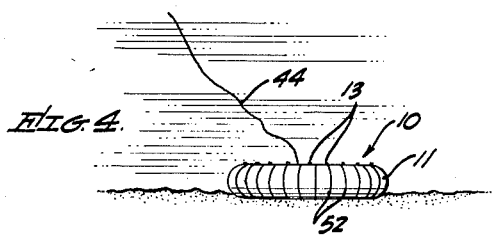
FIG. 4 illustrates the underwater vehicle resting upon the floor of a body of water and in condition wherein a container carried thereby may be filled.

In use of the present underwater vehicle, FIGS. 3, 4, 5 and 6 represent a sequence of operation. As shown in FIG. 3, a surface ship S may be used to place the vehicle 10 on the surface of a body of water. At this time, the fuse 41 is in position within the chamber 12. Thereafter the pump 48 serves to deliver water through the hose 36 and, upon opening of the valve 33, into the interior chamber 12 of the vehicle. The chamber 12 is then filled with water until the force of the springs 21 in the check valves 13 is overcome and water begins to flow from the openings 24 of the check valves. During this operation, the vehicle may be supported by suitable cables C extending from a hoist H carried by the ship S, cable attachment members 54, FIG. 1, being provided and secured to the upper surface of the body 11. Thereafter the valve 33 is closed, hose 36 removed and the cables C are released, permitting the vehicle to sink until it comes to rest on the floor of the body of water and assumes the attitude illustrated in FIG. 4. During descent, the cable 44 is suitably fed out. In practice, the cable 44 is composed of a material such as that commonly known as nylon, which has a weight similar to that of water, thus enabling a relatively long line to carry the required electrical leads to the squib or detonating device 43.

Figure 2:
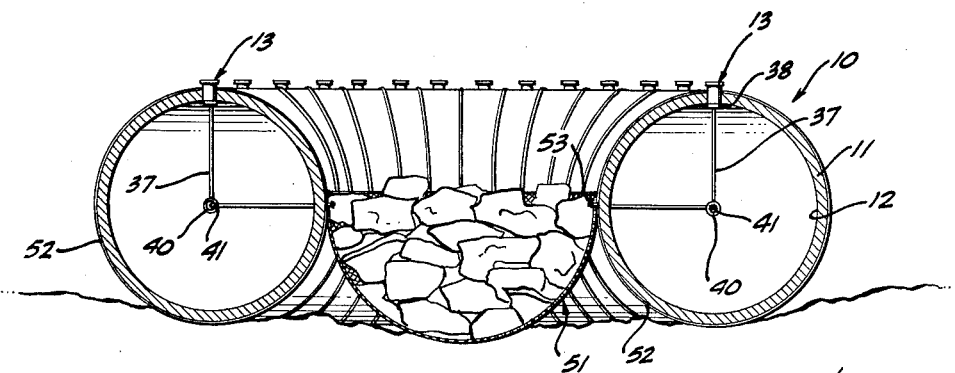
FIG. 2 is a transverse, sectional view through the present underwater vehicle and shown as resting upon the floor of a body of water and at the time of removal of water from an interior thereof.
Figure 5:
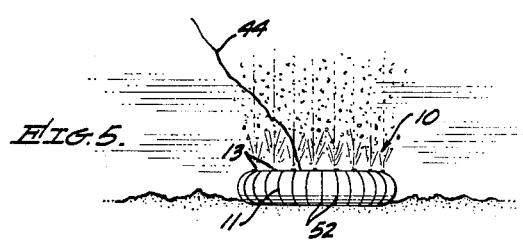
FIG. 5 is a view similar to FIG. 4, representing an exterior configuration and condition when water within the vehicle is forced therefrom as shown in detail in FIG. 2.

When objects to be transported have been placed in the basket 51 as by the means described hereinbefore, the switch 47 is closed, whereby to energize the squib 43 to detonate the fuse 41. Upon detonation of the fuse 41, a substantial pressure is created within the chamber 12, together with a relatively high temperature, to force the water existing in the chamber 12 outwardly through the check valves 13 and to convert at least a portion of the water to steam. Valves 13 serve to prevent the return of the water to the chamber 12, with the springs 21 in each of the valves 13 serving to permit bleed-down of the remaining gases within the chamber 13 to a pressure in excess of that in the surrounding atmosphere, as regulated by the force of the springs 21, thus to buoy the vehicle and start its ascent from the floor of the body of water. The condition of the vehicle at the time of detonation of the fuse 41 is illustrated in FIGS. 2 and 5, with the commencement of the ascent of the vehicle being illustrated in FIG. 6. During the ascent, as the water pressure decreases, the gases within the chamber 11 are bled outwardly through the valves 13, whereby to reduce the pressure thereof and to maintain a constant pressure differential across the body 11 and the continued buoyancy of the vehicle. When the vehicle reaches the surface of the body of water, the same pressure differential is thus being maintained across the body 11, and any tendency to cause the vehicle to be ejected above the surface of the water is eliminated. The cargo, in the form of the objects placed in the basket 51, is thus brought from the floor of the body of water to the surface thereof.

Following removal of the objects from the basket 51, the plate 25 may then be removed to reload the vehicle with a new fuse 41 and detonator. The plate is then replaced and the vehicle is in condition for another descent and ascent.

While the cable 44 is shown as extending to the ship S, with the power source and switch also being located at the ship S, it is to be understood that the power source may be self-contained within the vehicle 10 and the squib 43 may be energized by remote means or by a switch or the like disposed on the exterior surface of the body 11. It is also to be understood that the body 11 may assume different configurations without departing from the spirit and scope of the invention.

It may thus be seen that a relatively simple, effective and efficient means has been provided for effecting descent and ascent of an underwater vehicle. Also, it may be seen that the present underwater vehicle may be utilized at relatively great depths and there has been an elimination of the problems experienced heretofore in connection with attempts toward the raising of objects from the floor of deep bodies of water.

Having thus described the invention of the present embodiment thereof, it is desired to emphasize the fact that many further modifications may be resorted to in a manner limited only by a just interpretation of the following claims.

I claim:

1. An underwater vehicle comprising: a toroidal body having a toroidal chamber therein; means for initially filling said chamber with water to permit sinking of said vehicle; plural differential check valve means carried by said body and communicating between said chamber and an exterior of said body; explosive water ejection means disposed within said chamber for forcing said water therefrom and through said check valve means, whereby to buoy said vehicle; means for energizing said explosive water ejection means; and a container secured to and carried in the eye of said toroidal body.

2. An underwater vehicle for use in raising objects from a floor of a body of water comprising, in combination: a toroidal shaped body having an integral wall of substantial thickness and a toroidal chamber in said body defined by said wall; a plurality of differentially operable check valves secured in an upper portion of said wall of said body, said valves being annularly spaced and communicating between said chamber and an exterior of said body; an access opening in said wall of said body; a closure for said opening, said closure being secured to said body; a plurality of hangers disposed in said chamber and secured to said body; an explosive detonating fuse disposed in said chamber and maintained in an approximate center thereof by said hangers; detonating means in said chamber for said fuse; conduit means projecting into said chamber for admitting water to said chamber, detonation of said fuse serving to create sufficient pressure within said chamber to force water therefrom and through said check valves; and a basket secured to said body and disposed in the eye of said toroidal body for supporting said objects.

3. An underwater vehicle for use in raising objects from a floor of a body of water comprising, in combination: a toroidal shaped body having an integral wall of substantial thickness and a toroidal chamber in said body defined by said wall; a plurality of differentially operable spring biased, ball operated check valves secured in an upper portion of said wall of said body, said valves being annularrly spaced and communicating between said chamber and an exterior of said body; an access opening in said wall of said body; a closure for said opening, said closure being secured to said body; a plurality of hangers disposed in said chamber and secured to said body; an explosive detonating fuse disposed in said chamber and maintained in an approximate center thereof by said hangers; detonating means in said chamber for said fuse; conduit means projecting into said chamber for admitting water to said chamber, detonation of said fuse serving to create sufficient pressure within said chamber to force water therefrom and through said check valves; and a basket secured to said body and disposed in the eye of said toroidal body for supporting said objects, lower extremities of said basket disposed below a lower surface of said body.

References Cited in the file of this patent

UNITED STATES PATENTS

| | | |
|---|---|---|
| 557,396 | Kindt | Mar. 31, 1896 |
| 1,300,715 | Fosgate | Apr. 15, 1919 |
| 1,300,943 | Farnham | Apr. 15, 1919 |
| 2,413,985 | Manson et al. | Jan. 7, 1947 |

FOREIGN PATENTS

| | | |
|---|---|---|
| 1,378 | Great Britain | Dec. 3, 1908 |